Patented Sept. 19, 1933

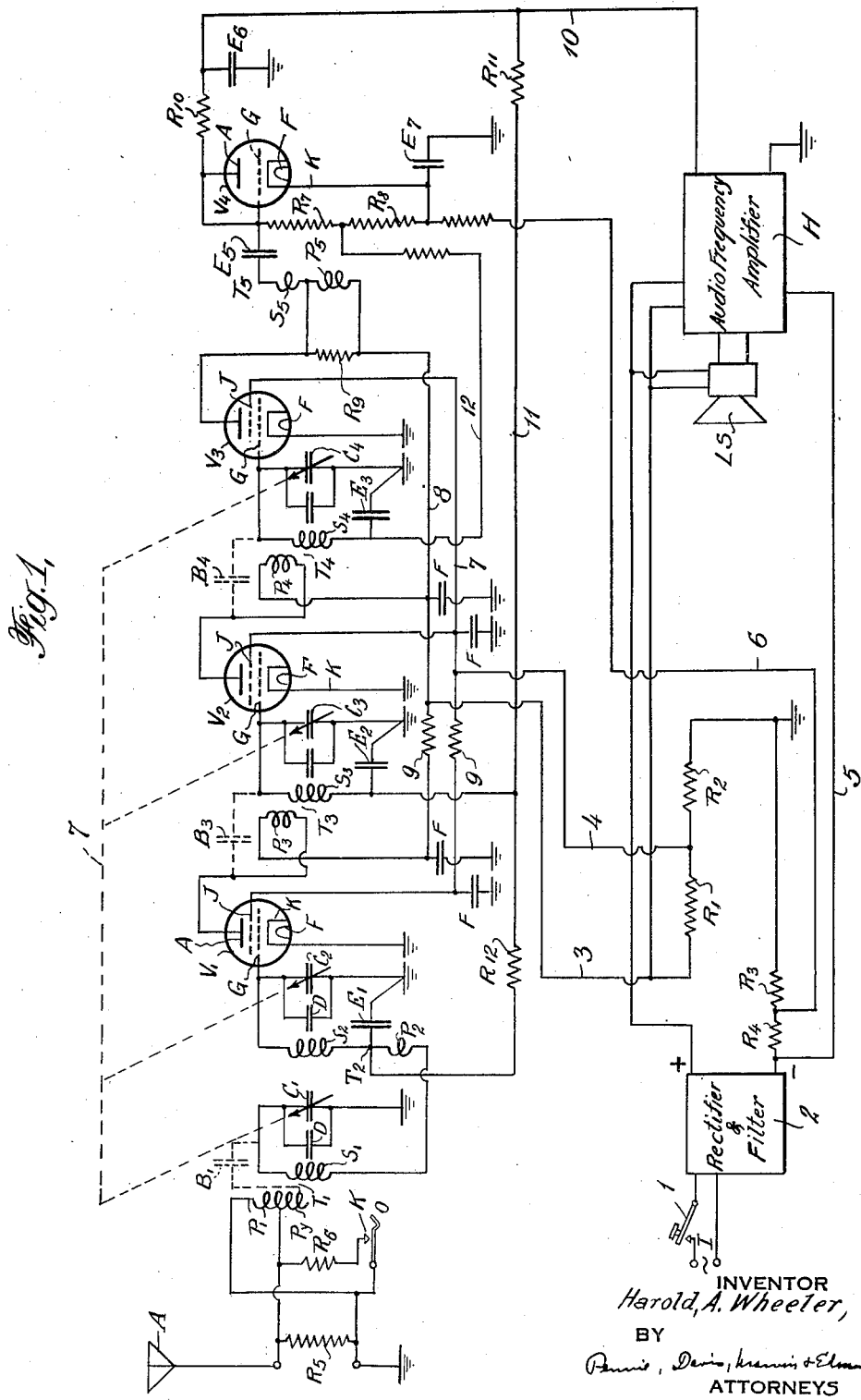

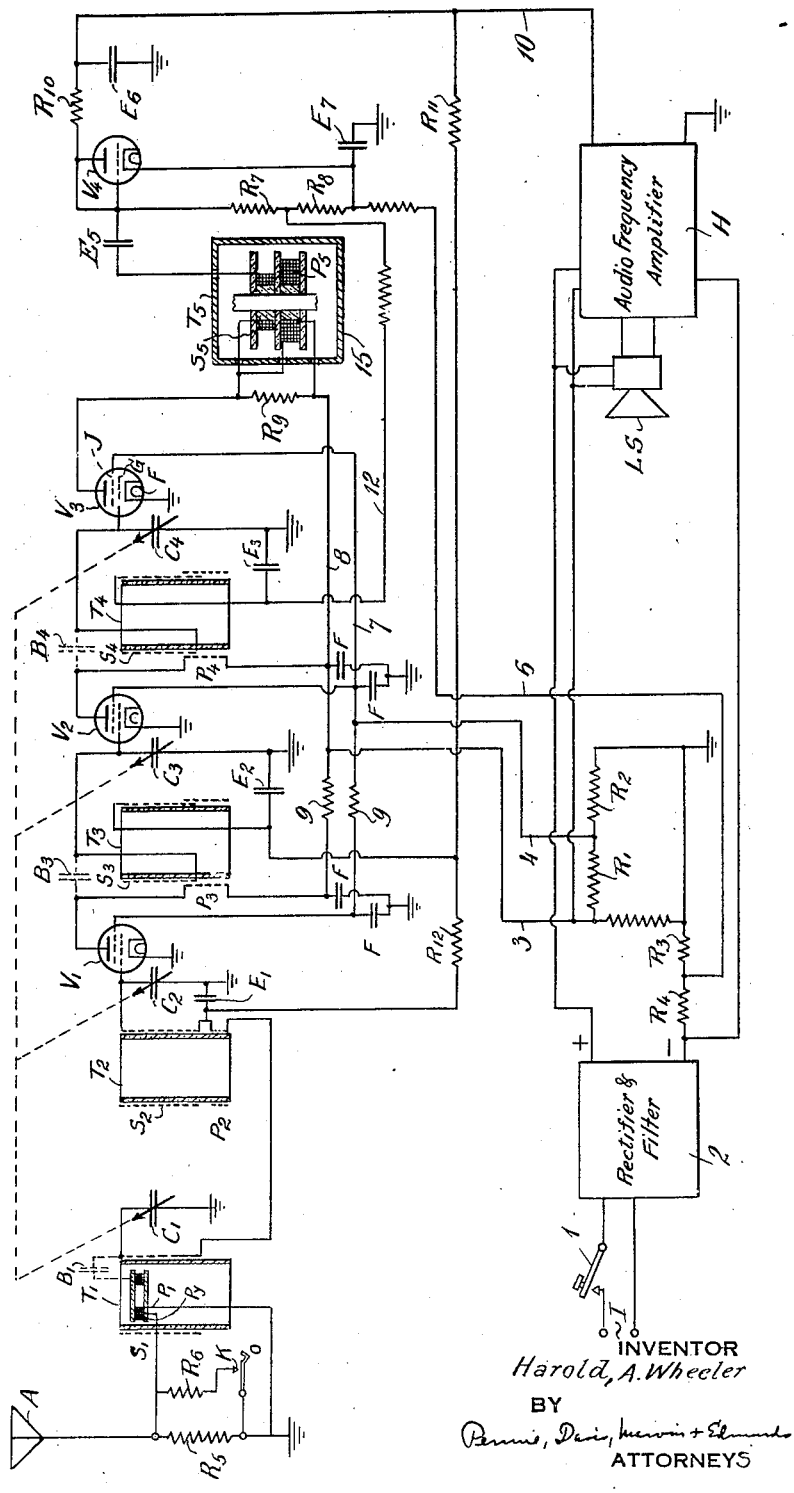

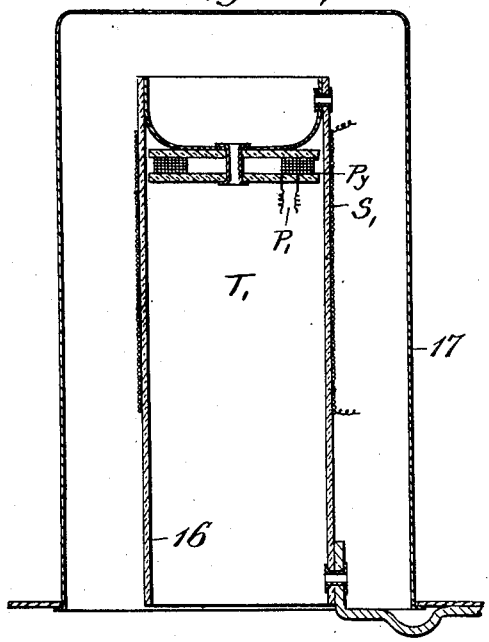
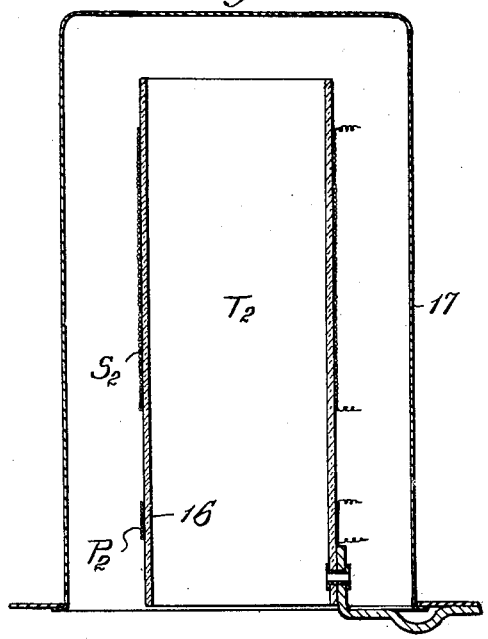
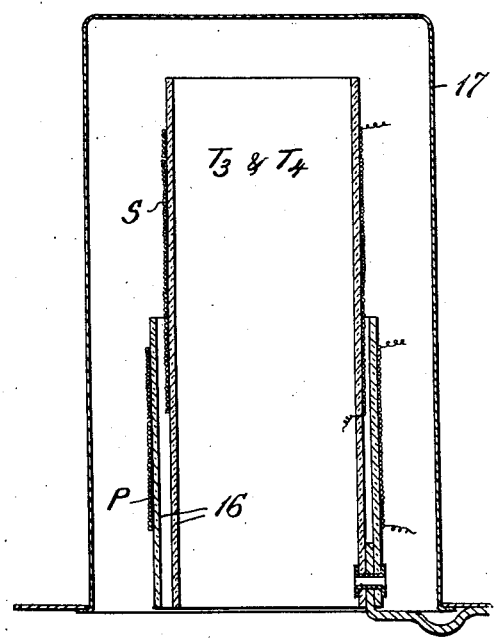
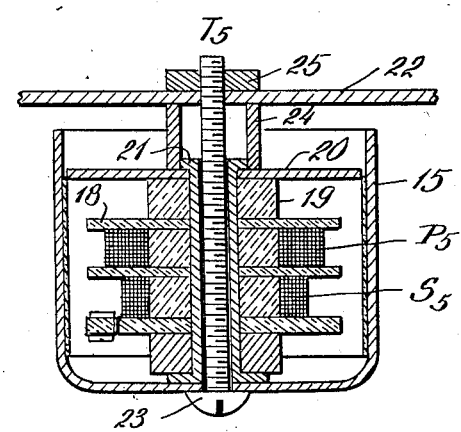

1,927,672

UNITED STATES PATENT OFFICE 1,927,672

WAVE SIGNALING SYSTEM

Harold A. Wheeler, Great Neck, N. Y., assignor to Hazeltine Corporation, a corporation of Delaware Application September 10, 1930
Serial No. 480,947

17 Claims. (Cl. 178—44)

This invention pertains to radio receivers and more especially to multi-stage thermionic receivers tunable over a range in frequency such as are intended primarily for the reception of speech and music within the "broadcast" band of frequencies.

In accordance with the invention a receiver of the mentioned type is provided in which the successive elements of the radio frequency portion are interconnected by means of coupling circuits having controllable amplification-frequency characteristics, the design of the individual coupling circuits together with their cooperative action in the receiver being such as to provide substantially uniform overall sensitivity and selectivity for the receiver throughout the tunable range consistent with stability of operation.

Coupling circuits broadly operative in accordance with the principles utilized herein are set forth in Patent 1,763,380 issued to C. E. Trube, June 10, 1930 and in his copending application Serial No. 101,906 filed April 14, 1926, and Serial No. 120,045 filed July 2, 1926, as well as in a copending application of W. A. MacDonald, Serial No. 280,464, filed May 25, 1928. The circuits of the present invention differ from those of MacDonald and Trube as regards the type of circuit utilized together with the specific mode of operation thereof, and in the mentioned cooperative action of all the circuits providing uniform overall sensitivity for the receiver; as well as in the disclosure herein of novel features of construction and assembly for coupling circuits having controllable amplification characteristics.

The receiver of the present invention employs automatic volume control in the form of a negative biasing voltage applied from the detector tube to the grids of one or more of the radio frequency amplifier stages, after the fashion broadly disclosed and/or claimed in the present inventor's copending application Serial No. 203,879 filed July 7, 1927, and his United States Patents 1,879,861, 1,879,862 and 1,879,863, all issued September 27, 1932. Owing to the absence of a continuous antenna volume control the incoming signal is normally impressed with full intensity upon the input of the first radio-frequency amplifier tube. Therefore careful preselection of the signal is required in order to avoid cross-modulation effects in the first amplifier tube resulting in interference in the reproduced sound effects. To this end two tuned circuits are interposed between the antenna and the first radio frequency amplifier tube. The design of this doubly tuned system embodies both in the circuit arrangement utilized and in its structural details, a number of the features deemed novel to the present invention having reference to controllable amplification characteristics, unicontrolled tuning, and means for filtering out fluctuations of the automatic grid biasing potential.

The above as well as other novel features of the present invention are best explained by referring immediately to the drawings, of which:

Fig. 1 shows in diagrammatic form a multi-stage thermionic receiver in accordance with this invention;

Fig. 2 is a circuit diagram similar in scope to Fig. 1 which discloses the winding arrangement of the inter-stage coupling transformer and the method of connecting the same in circuit.

Figs. $3a$, $3b$, $3c$ and $3d$ are sectional views illustrating the construction of the several transformers utilized in the coupling circuits.

Like elements are similarly designated in the several figures.

Referring to the drawings the radio frequency amplifier of this receiver employs four tuned circuits designated by transformers $T_1$ to $T_4$, inclusive, together with their associated tuning capacities $C_1$ to $C_4$, one untuned transformer $T_5$, and three screen grid amplifier tubes $V_1$ to $V_3$ inclusive. Two of the tuned circuits, including transformers $T_1$ and $T_2$, are coupled together and connected between the antenna A and the input terminals of the first amplifier tube $V_1$. The other two tuned circuits including transformers $T_3$ and $T_4$ are utilized for interconnecting the amplifier tubes $V_1$ and $V_2$, and $V_2$ and $V_3$, respectively, in cascade relation. The untuned transformer $T_5$ connects the last amplifier tube $V_3$ to the input section of a detector tube $V_4$, the output of which is connected through an audio frequency amplifier H to a loud speaker LS.

The necessary direct currents for operating the receiver are obtained in the first instance from a source of alternating current I, which is supplied through a power switch 1 to a rectifier-filter 2, the latter serving to convert the alternating into substantially constant direct current delivered to an output circuit comprising in series the loud speaker field winding and certain elements of the audio frequency amplifier together with resistances $R_1$ to $R_4$ inclusive.

The upper terminal of the filter-rectifier 2 provides positive potential to be applied over conductors 3 and 4 to the anodes A in multiple and the screen grids J in multiple of tubes $V_1$ to $V_3$ inclusive. The rectifier output circuit is grounded between resistances $R_2$ and $R_3$ in order to provide suitable negative biasing potentials to be applied respectively over conductor 5 to the grids of the audio frequency amplifier tubes, and over conductor 6 to the cathode of the rectifier tube $V_4$. The heater filaments F of the tubes may be heated in any suitable manner (not shown) preferably from an alternating current transformer secondary winding associated with the rectifier-filter circuit 2. The transformers $T_1$ to $T_4$, inclusive, are of the two-winding variety having their secondaries S tunable by means of variable condensers $C_1$ to $C_4$, inclusive, respectively. The tuning condensers are all alike and are arranged mechanically to be simultaneously adjustable by means of a uni-control element 7 on the panel of the receiver. In parallel with each tuning condenser is an adjustable condenser D which is set to bring all tuned circuits to resonance at some frequency near the highest frequency of the tuning range, thereby correcting for the differences in minimum circuit capacity of the several tuned circuits. The similarity of the tuning condensers, the correction afforded by the adjustable condensers D, and other cooperating features which will be discussed later assure like tuning of all the tuning circuits so that uni-control operation is obtainable without loss of selectivity or amplification.

The employment of more than one tuned circuit intermediate the antenna and the first amplifier tube is desirable in order to eliminate interference from strong local stations which would otherwise produce the mentioned cross-modulation effects. Cross modulation is observed when a strong interfering signal is impressed on the input terminals of the first tube, in addition to the carrier wave of the desired signal. As a result, the carrier wave is modulated in accordance with the interfering signal so that discrimination of this kind of interference cannot be accomplished by the tuning adjustment of the subsequent amplifying stages. Owing to the use of automatic volume control in the present receiver, which does not operate to attenuate either the desired or the interfering signal before it is applied to the first tube, it will be apparent that unless the desired signal is carefully selected and the undesired signals discriminated against before application thereof to the first amplifier tube, the undesired cross-modulation effects will occur. It is primarily for this reason that the two tuned circuits are interposed between the antenna circuit and the input to the first tube.

The first tuned circuit includes in series between grounded connections: the tuning condenser $C_1$ in parallel with the adjustable condenser D, the secondary winding $S_1$ of the antenna transformer $T_1$, the primary winding $P_2$ of the second transformer $T_2$ and a condenser $E_1$. The secondary winding $S_1$ is magnetically coupled to the primary winding $P_1$ which in turn is connected between the antenna and ground terminals of the antenna circuit. The antenna transformer $T_1$ embodies the principles of operation described in the above mentioned copending application of W. A. MacDonald, i. e. the antenna winding $P_1$ has a sufficiently high inductance so that it resonates with the capacity of an average antenna at a frequency somewhat lower than the tuning range. The primary coil $P_1$ is then coupled to the secondary $S_1$ with a moderate degree of electromagnetic coupling, and in addition with a small amount of inherent capacitive indicated by the condenser $B_1$ shown dotted.

The performance of this circuit was found to be substantially improved by adding a number of dead-end turns $P_y$ to the antenna coil. The dead-end winding $P_y$ serves two purposes. First, the added turns are so positioned as to increase the amount of inherent capacity $B_1$ to the secondary coil, and secondly, there is a higher voltage impressed on the capacity $B_1$ as a result of the increased number of turns in the primary coil.

The structural design of the transformer $T_1$ is shown in cross section in Fig. 3a, in which it will be observed that the primary winding is of annular form comprising coil $P_1$ made up of a number of turns wound upon an insulated bobbin, while the dead-end turns $P_y$ are wound upon the turns $P_1$. The bobbin is positioned coaxially within the upper or high potential end of the secondary coil, as is clearly shown in Fig. 2. This arrangement secures the required electromagnetic and electrostatic couplings between the primary and secondary circuits, these couplings being chosen to be additive in their effects on the secondary circuit.

Due to the low resonance frequency of the primary circuit, the electromagnetic coupling is relatively more important at the lower frequencies within the tuning range. Due to its lower reactance at the higher frequencies, the capacitive coupling $B_1$ becomes relatively more important as the upper frequency limit is approached. The combination of the two couplings between primary and secondary circuits together with the low resonant frequency of the primary circuit results in a voltage amplification characteristic which can be predetermined within wide limits at the will of the designer.

The consideration which limits the voltage amplification obtainable between primary and secondary circuits of transformer $T_1$ is the detuning effect on the secondary circuit when antennas are employed having capacities differing widely from that of the average antenna. Since any change in antenna capacity from the average value is reflected into the secondary circuit by virtue of the primary to secondary coupling effects, it is necessary that both the electromagnetic and electrostatic couplings in the transformer $T_1$ be made sufficiently small so that the detuning effect of the antenna is negligible. These couplings, however, should not be reduced any further than is required to effect this end since an unnecessary loss in amplification would result. It appears that the choice of couplings is a compromise which is determined in any given case by the performance required in the antenna circuit.

When an antenna is used having greater than average capacity, the resonant frequency of the primary circuit is reduced and thereby removed further from the tuning range of the receiver. The detuning effect therefore, produced by a larger than average antenna capacity, or even of a short circuit between antenna and ground terminals is relatively small. When antennas are used having less than average capacity, however, the resonant frequency of the primary circuit approaches the tuning range, and in some cases even falls within the range, in which event the detuning effect tends to become very large. In order to avoid such contingency the resistance $R_5$ is connected between the antenna and ground terminals, the value of which is chosen sufficiently large to have negligible effect on the performance of the circuit for antennas of average or greater capacity. The resistance $R_4$, on the other hand, is sufficiently small so that it serves to prevent any sharp resonance effect in the primary circuit when the antenna has less than average capacity. In this way the detuning effect due to variations of antenna capacity, reflected into the secondary circuit of transformer $T_1$, can be held within as close limits as is required. Good practice dictates that in a receiver of the type disclosed herein the detuning effect should be maintained within about 1% of the resonant frequency, and this has been accomplished for as great antenna variations as are met with in practice by utilizing the coil structure shown in Fig. 3a.

In the case of extremely high signal intensities which occur when a powerful local station is tuned in, the automatic volume control action of the receiver may not alone be sufficient to maintain the reproduced sound intensity within satisfactory limits. In this case a "local" switch K may be operated to connect a low impedance shunt $R_6$ across the primary winding of the antenna transformer. This shunt may be a low resistance as indicated or a relatively large condenser.

The primary coil $P_1$ decreases the apparent inductance of the secondary coil by a small fraction of its total value. It is desirable to make all secondary coils of the transformers $T_1$ to $T_4$ alike in order to facilitate synchronous tuning, which does not permit of adding to the number of turns on the secondary coil $S_1$ in order to compensate for the decrease in apparent inductance thereof due to the effect of the primary circuit. Therefore this effect is compensated by suitable choice of the self-inductance of the primary winding $P_2$ of transformer $T_2$ which is connected in series with the secondary winding $S_1$. The winding $P_2$ is thus made of sufficiently high self-inductance to tune secondary circuit $S_1 C_1$ to the same frequencies as the remaining tuned circiuts.

The second tuned circuit includes in series between ground connections: a tuning condenser $C_2$, the secondary winding $S_2$ of transformer $T_2$ and the condenser $E_1$. The condenser $E_1$ is common to the first and second tuned circuits, and provides a capacitive coupling therebetween which is much greater at the lower frequencies within the tuning range, owing to its higher reactance at lower frequencies. The condenser coupling $E_1$ is supplemented by the mutual inductance between the primary and secondary coils $P_2$ and $S_2$ respectively, whose contribution to the total coupling between primary and secondary circuits is the same over the entire tuning range. The combination of two such couplings in this manner is described in the co-pending applications of C. E. Trube. The couplings can be so chosen that the total varies from a minimum value at the higher frequencies to a maximum value at the low frequencies within the tuning range, which is in accord with the usual requirement for maximum selectivity at the higher frequencies and nearly optimum coupling for maximum amplification at the lower frequencies.

The condenser $E_1$ has relatively large capacity as compared with the tuning condenser $C_2$, but has nevertheless an appreciable effect on the tuning of the first and second tuned circuits. Therefore similar condensers $E_2$ and $E_3$ are included in the third and fourth tuned circuits to assure like tuning in all of the circuits. In addition to providing like tuning, these condensers are also utilized as radio frequency by-pass condensers for the grid biasing voltages applied over conductors 11 and 12 to the corresponding radio frequency amplifier tubes.

The structural details of transformer $T_2$ are shown in Fig. 3b while its mode of connection in the circuit is clearly indicated in Fig. 2. The self-inductance of the primary coil $P_2$ is determined in the manner described above, while relative positions of the two coils on the insulating tube is determined by the required mutual inductance between the first and second tuned circuits.

The two interstage transformers $T_3$ and $T_4$ are identical as are the coupling capacities associated therewith. It will thus be necessary to discuss only one of these coupling circuits which in the case of transformer $T_3$ includes the tuned circuit comprising in series connection: the tuning condenser $C_3$, the transformer secondary winding $S_3$ and the condenser $E_2$ referred to above. The primary coil $P_3$ is coupled to the secondary with a moderate degree of magnetic coupling and also capacitively through the inherent capacity $B_3$ existing between the overlapping ends of the primary and secondary coils respectively.

The structural arrangement of the transformer windings is shown in Fig. 3c, while their mode of connection in the circuit is clearly brought out in Fig. 2. In the coil structure as shown the secondary coil is wound in the direction of a right hand screw and the primary coil in the direction of a left hand screw. This feature combined with a method of connecting in the circuit as shown in Fig. 2, provides that the plate end of the primary coil and the grid end of the secondary coil have like alternating current polarity. It is between these two coil terminals that the capacity $B_3$ exists in the coil structure.

The primary $P_3$ together with the capacity $B_3$ and the total anode-to-ground capacity of the preceding tube $V_1$ is resonant at a frequency somewhat higher than the tuning range of the receiver. The magnitude of the magnetic coupling between primary and secondary coils and of the coupling capacity $B_3$ are selected or adjusted in such a way that the capacitive coupling opposes and partly compensates for the electromagnetic coupling throughout the tunable range, this opposing effect being negligible at lower frequencies and increasing as the frequency of tuning approaches the resonance frequency of the primary circuit. As a result of this arrangement the effective number of primary turns on the transformer is a maximum at the lower frequencies of tuning but is automatically decreased to a substantially lower value at the higher frequencies of tuning, which are nearer the resonant frequency of the primary circuit. In the transformer structure of Fig. 3c the effective number of primary turns was reduced in this way to a value at the highest tuning frequency of about ½ that at the lower tuning frequencies.

The important considerations in the design of a transformer such as $T_3$ are the following: The inductance of the primary winding should be sufficiently large so that the primary circuit is resonant at a frequency somewhat higher, but not too much higher, than the highest frequency within the tuning range. In the present instance a satisfactory solution is obtained by making the inductance of the primary coil substantially equal to that of the secondary coil, so that the primary circuit with its inherent capacities is resonant at a frequency above the highest frequency of the tuning range. The coefficient of coupling between the primary and secondary circuits must not be too great, because in that case the primary and secondary coils would be tuned as a unit by adjustment of the tuning condenser $C_3$, and the resonant frequency of the primary circuit alone would not have the desired effect. On the other hand the coefficient of coupling must not be too small since this would correspondingly reduce the amplification obtainable. In a receiver embodying the present invention a coefficient of coupling of 27% was found satisfactory, but that value might vary substantially in other receiver designs. The capacity $B_3$ must be sufficiently large to oppose the electromagnetic coupling by a substantial amount of the higher frequencies. The value of $B_3$ was 12 micromicrofarads in this same receiver, and the resonant frequency of the primary circuit was 2000 kilocycles as compared with the broadcast band of 550 to 1500 kilocycles.

It was found for a transformer of the design shown in Fig. 3c, that a change in the amount of overlap between the primary and secondary coils changes the relationship between the electromagnetic and electrostatic coupling; so that the performance of the transformer both in degree of amplification and in the variation of amplification with tuning frequency, can be controlled within wide limits by simply changing the amount of overlap. From this it follows, of course, that in the manufacture of coils of this type the amount of overlap must be maintained quite precisely in order to insure like performance of all coils. With other type of construction it might not be possible to secure a sufficiently large inherent coupling capacity $B_3$ in the coil assembly, in which event a small condenser could be connected in parallel therewith to supplement the same. Such a supplemental condenser could of course be utilized for the entire coupling capacity $B_3$ if desired.

In the interstage coupling circuits, the presence of the primary winding does not appreciably affect the apparent inductance of the secondary winding, so that in these circuits no correction is necessary like that which was required for the secondary circuit of transformer $T_1$.

Following the two tuned radio frequency amplifier tubes $V_1$ and $V_2$ with their associated output transformer $T_3$ and $T_4$ respectively, is an "untuned" stage of radio frequency amplification which includes tube $V_3$ and the associated output transformer $T_5$. Since the total amplification of the stages preceding the untuned stage is greater at the higher frequencies within the tuning range, the untuned transformer $T_5$ is desired to give a higher amplification at the lower frequencies, and thereby to make the overall sensitivity of the receiver substantially uniform throughout the tuning range.

The structural details of the untuned transformer are apparent from the cross-sectional view shown in Figure 3d, whereas the manner of connecting the windings in circuit are clearly shown in Figs. 1 and 2. Referring to Fig. 3d the transformer is enclosed in a small cylindrical iron cup 15 which shields the windings on all sides except toward the base 22, on which the coil assembly is mounted. On the latter side the shielding is completed by means of an iron disc 20 attached to and forming a part of the coil assembly on the eyelet 21. It is desired that the eyelet 21 together with the above mentioned shielding cup and disc be of iron since this permits a greater amount of magnetic flux to circulate around the transformer coils, although the added effect of the iron is relatively small at these radio frequencies. The resonant frequency of the untuned transformer $T_5$ is approximately the lowest frequency of the tuning range. In order to prevent sharp resonance occurring at this frequency, which is undesired in an untuned transformer, a resistance $R_9$ is connected across the primary winding $P_5$ as shown in the drawings. In addition the loading effect of the input circuit of the detector $V_4$ contributes to this function.

The detector tube $V_4$, the grid circuit of which is connected to the untuned transformer secondary winding $S_5$ through the blocking condenser $E_5$, is connected to operate as a two-element rectifier and simultaneously performs two functions. It rectifies the signal and impresses a resulting audio frequency voltage over conductor 10 upon the input terminals of the audio frequency amplifier H, constituting the grid circuit of the first amplifier tube. The detector $V_4$ also supplies a negative grid biasing voltage to each of the radio amplifying tubes $V_1$ to $V_3$ and also to the first audio frequency amplifier tube, which biasing voltage varies with the signal intensity and thereby accomplishes automatic volume control. The principles of operation of a detector of a type disclosed herein and of the automatic volume control arrangements utilized in this receiver are described in the copending application of the present inventor, Serial No. 203,879, filed July 7, 1927, and in his United States Letters Patent 1,879,863, issued September 27, 1932.

The negative grid biasing voltage which is applied to the first two radio frequency amplifier tubes $V_1$ and $V_2$, is obtained partly through the connection 6 from the rectifier and filter circuit 2, and partly from the rectified signal of the detector circuit. The resultant grid bias voltage is conducted from the detector through resistance $R_{10}$ which in combination with the condenser $E_6$ filters out the radio frequency fluctuations in voltage, and thence through resistance $R_{11}$ and over conductor 11 to the grids of tubes $V_1$ and $V_2$ through the secondary windings of transformers $T_2$ and $T_3$, respectively. The resistances $R_{11}$ and $R_{12}$ in cooperation with condensers $E_1$ and $E_2$ filter out the audio frequency fluctuations of the grid biasing voltages. The resistance $R_{12}$ prevents radio frequency coupling between condensers $E_1$ and $E_2$.

A grid biasing voltage for the third tube $V_3$ is conducted in a similar manner from an intermediate point of the detector circuit over conductor 12 to the grid electrode of the tube. Since tube $V_3$ delivers a relatively high signal output to the detector, a smaller grid biasing voltage is in this case desired which is obtained in the manner indicated.

The remaining elements of the radio frequency amplifier such as the condensers F and the resistors 9 serve only the functions of by-passing the radio frequency currents to ground, and preventing their passing from one stage to another within the amplifier. The condensers F have sufficiently large capacities so that they do not affect the operation of the radio frequency coupling circuits which have been described in detail. The condenser $E_7$ provides a radio and audio frequency by-pass to ground for the cathode of the detector tube.

What is claimed is:

1. A radio-frequency transformer comprising inductively coupled primary and secondary coils, an input terminal connected to an intermediate tap on said primary coil, an input terminal connected to an end of said primary coil, and a pair of terminals connected to said secondary coil, the remaining end of said primary coil terminating in an open circuit and being the portion of said primary which is closest to said secondary whereby there is provided inherent capacitive coupling therewith.

2. A high-frequency transformer having separate primary and secondary windings positioned relatively for providing electrostatic as well as electromagnetic coupling therebetween, input connections extending respectively to an end and to an intermediate point of said primary winding, the remaining portion being open-ended, said open-ended portion of said primary winding being the portion thereof which is nearest to said secondary winding and is therefore adapted to increase the magnitude of said electrostatic coupling and also the voltage impressed thereupon from said primary winding.

3. A high-frequency transformer comprising a distributed cylindrical secondary winding and coaxial therewith an annular primary winding positioned within the axial limits of said secondary winding, input connections extending respectively to an intermediate point of said primary and to the terminal thereof remote from said secondary, the remaining portion of said primary winding being open-ended, whereby said open-ended portion of said primary serves to increase the inherent capacitive coupling existing between said windings and also the voltage impressed upon said secondary from said primary circuit.

4. In combination, a tuned radio-frequency transformer comprising inductively coupled primary and secondary coils, a variable condenser connected to said secondary coil for tuning the same over a range in frequency, an antenna connection to an intermediate point of said primary coil, one end of each of said coils being effectively connected to ground for currents of radio frequency, the opposite end of said primary coil terminating in an open circuit and being of opposite open-circuit polarity to the ungrounded terminal of said secondary coil, the open-circuited portion of said primary coil being arranged relatively to said secondary for providing inherent capacity between said coils, and said primary coil together with said inherent capacity and said antenna connection being resonant at a frequency slightly below said tuning range.

5. A tuned radio-frequency coupling system comprising at least a pair of closed resonant circuits having individual thereto, similar inductive windings and variable condensers for tuning the same over a range in frequency, uni-control means for simultaneously adjusting said condensers, a primary circuit inductively coupled to a first said winding which decreases the effective inductance of said winding by a small amount, and a coil in series with said first winding adapted to compensate the said reduction in its effective inductance, and adapted further to couple said first winding to some other element of said system.

6. In combination, a tuned radio-frequency coupling system including a pair of resonant circuits having individual thereto similar fixed inductive coils and variable condensers for tuning said coils over a range in frequency, means for simultaneously adjusting said condensers, and an antenna circuit coupled to a first said coil whereby the effective inductance thereof is decreased by a small amount, and a coupling coil in series with said first coil having an inductance equal to said small amount, said coupling coil being inductively related to the second of said fixed inductive coils.

7. In combination, a tuned radio-frequency coupling system including a pair of resonant circuits, each circuit including in series a fixed inductive coil and a variable condenser for tuning the same over a range in frequency, a fixed coupling condenser common to and serially included in both said circuits, and means providing a magnetic coupling between said circuits so arranged as to aid the capacitive coupling therebetween due to said fixed condenser and a thermionic tube having at least two electrodes, means connecting a first terminal of one of said coils to one of said electrodes and a second terminal of said latter coil to a terminal of said fixed condenser the opposite terminal of which is connected to ground.

8. A high-frequency electric coupling system comprising a pair of tunable circuits each including a fixed inductive winding and a variable capacity one terminal of which is connected to ground and its opposite terminal to a terminal of the associated winding, a coupling coil serially connected from the remaining terminal of a first to the remaining terminal of the second of said windings, and a fixed capacity connected from ground to a point between said second winding and said coupling coil, said coupling coil being so coupled magnetically to said second winding as to provide a magnetic coupling between said tunable circuits which aids the capacitive coupling therebetween due to said fixed capacity.

9. In combination, a tuned radio-frequency system including at least three resonant circuits, each said circuit having in series a fixed inductive coil and a variable tuning condenser, means for simultaneously adjusting said condensers, a fixed capacity common to and serially included in a pair of said resonant circuits, and a similar fixed capacity serially included in at least one other of said resonant circuits, at least one thermionic tube including a pair of electrodes, means grounding one terminal of said fixed capacities, means connecting a first terminal of one of said coils to one of said electrodes and a second terminal of said latter coil to a terminal of the associated fixed condenser the opposite terminal of which is connected to ground.

10. In combination, a plurality of resonant circuits tunable throughout a range in frequency, means electrically coupling at least two of said circuits including a fixed capacity common thereto, similar fixed capacities individual to the remaining said circuits for providing like tuning of all said circuits throughout said tunable range, means individually connecting the circuits containing said fixed capacities to the grid circuits of a corresponding plurality of thermionic tubes, and means for applying to the grids of said tubes unidirectional biasing potentials subject to undesired fluctuations in such manner that said fixed capacities function to by-pass said undesired fluctuations away from said electrodes.

11. An electrode coupling circuit comprising a secondary coil tunable over a range in frequency by a variable capacity connected thereto, and a primary coil having associated capacity adapted to render the same resonant at a frequency slightly above said range, and a high-frequency path extending between primary and secondary terminals of like open-circuit polarity, said primary and secondary coils being moderately coupled magnetically, and arranged relatively to provide inherent capacity between portions thereof adjacent the remaining terminals thereof such that the resultant capacitive coupling between coils opposes the said magnetic coupling to a substantial degree as the tuning frequency approaches the resonant frequency of said primary coil.

12. An electric coupling circuit comprising a high-frequency transformer having separate coaxially positioned primary and secondary coils helically wound of opposite hand respectively, a variable condenser connected to said secondary coil for tuning the same over a range in frequency, said primary coil having capacity associated therewith adapted to render the same resonant at a frequency slightly above said range, said primary and secondary coils being moderately coupled magnetically and arranged to have a pair of their terminal portions which are of like open-circuit polarity remote from each other, and the remaining terminal portions thereof closely adjacent each other for providing inherent capacitive coupling between said windings which opposes said magnetic coupling throughout said frequency range, and a high-frequency path electrically connecting said remote primary and secondary terminals.

13. An electric coupling circuit tunable throughout a range in frequency, comprising a secondary circuit including a fixed inductive winding and variable capacity bridged between output terminals, and a primary winding coupled to said secondary with a moderate degree of magnetic coupling, a capacitive coupling existing between said windings arranged to oppose said magnetic coupling by a substantial amount, said primary winding together with the capacity associated therewith in the operation of said circuit being resonant at a frequency slightly above said tuning range for providing a desired variation in resultant coupling between said windings throughout said frequency range.

14. An electric coupling system adapted to interconnect successive tubes in a multi-stage radio-frequency thermionic amplifier, comprising a transformer having a secondary winding tunable over a range in frequency by a variable capacity connected thereto, and a primary winding whose self-inductance is of the same order of magnitude as that of said secondary winding, means so positioning said windings as to provide a moderate degree of magnetic coupling therebetween as well as a capacitive coupling due to the inherent capacity between windings which opposes said magnetic coupling for causing the ratio of the resonant secondary voltage to the accompanying primary voltage automatically to rise as the frequency of tuning is increased, whereby high degrees of sensitivity and stability are maintained throughout said tunable frequency range.

15. In a multi-stage radio-frequency thermionic amplifier an electric coupling system interconnecting successive thermionic tubes thereof, each tube having anode, cathode and grid, said system comprising a transformer having a secondary winding connected between cathode and grid of one said tube and tunable over a range in frequency by a capacity in shunt thereto, and a primary winding connected between anode and cathode of the preceding tube, said anode and grid being connected to winding terminals of like open circuit polarity, said primary winding having an inductance of the same order of magnitude as said secondary, means so positioning said windings as to provide a moderate degree of magnetic coupling therebetween as well as a capacitive coupling due to the inherent capacity between windings which opposes said magnetic coupling, for causing the ratio of the resonant secondary voltage to the accompanying primary voltage automatically to rise as the frequency of tuning is increased, whereby high degrees of sensitivity and stability are maintained throughout said frequency range.

16. A high-frequency coupling circuit for interconnecting successive thermionic tubes each having anode, cathode and grid, of a multi-stage thermionic amplifier, said coupling circuit comprising a transformer having coaxially positioned primary and secondary windings wound oppositely with a portion of one winding overlapping a portion of the other to provide capacitive as well as magnetic coupling therebetween, a variable capacity in shunt to said secondary winding for tuning the same over a range in frequency, means connecting the terminal of the overlapping portion of said secondary winding to the grid of one tube and the corresponding terminal of the primary winding to the anode of the preceding tube, and the remaining terminals of said windings to the cathodes of said tubes respectively, whereby in the operation of said system said capacitive coupling opposes said magnetic coupling for providing uniformly high sensitivity, selectivity and stability over said tunable frequency range.

17. A tunable high-frequency electrical coupling circuit for interconnecting successive thermionic tubes each having anode, cathode and grid, of a multi-stage thermionic amplifier, said circuit comprising a transformer having coaxially positioned helical primary and secondary windings wound oppositely, with a portion of one winding overlapping a portion of the other to an extent providing a moderate degree of magentic coupling therebetween as well as capacitive coupling due to the inherent capacity existing between windings, a variable capacity in shunt to said secondary winding for tuning said circuit over a range in frequency, means connecting the terminal of the overlapping portion of said secondary to the grid of one said tube and the corresponding terminal of the primary windings to the anode of the preceding tube, and the remaining terminals of said windings to the cathodes thereof respectively, said primary windings together with the associated capacities in the operation of said circuit being resonant at a frequency slightly above said frequency range whereby said capacitive coupling opposes said magnetic coupling to a substantial degree as the tuning frequency is adjusted toward the upper frequency limit.

HAROLD A. WHEELER.